(12) United States Patent
Roberts et al.

(10) Patent No.: US 8,022,631 B2
(45) Date of Patent: Sep. 20, 2011

(54) COLOR CONTROL OF LIGHT SOURCES EMPLOYING PHOSPHORS

(75) Inventors: Bruce R. Roberts, Mentor-on-the-Lake, OH (US); William Winder Beers, Chesterland, OH (US); Andrew Albrecht, Shaker Heights, OH (US)

(73) Assignee: General Electric Company, Schenectady, NY (US)

( * ) Notice: Subject to any disclaimer, the term of this patent is extended or adjusted under 35 U.S.C. 154(b) by 386 days.

(21) Appl. No.: 12/263,727

(22) Filed: Nov. 3, 2008

(65) Prior Publication Data

US 2010/0109541 A1 May 6, 2010

(51) Int. Cl.
*H01J 17/28* (2006.01)
*H05B 37/02* (2006.01)

(52) U.S. Cl. .......................................... 315/117; 315/307

(58) Field of Classification Search .................... 315/10, 315/11.5, 32, 50, 112, 117–118, 291, 307, 315/224, 312
See application file for complete search history.

(56) References Cited

U.S. PATENT DOCUMENTS

| | | | |
|---|---|---|---|
| 5,998,925 A | 12/1999 | Shimizu et al. | |
| 6,522,965 B1 | 2/2003 | Gierling | |
| 6,538,371 B1 | 3/2003 | Duggal et al. | |
| 6,566,808 B1 | 5/2003 | Duggal et al. | |
| 6,800,999 B1 | 10/2004 | Duggal et al. | |
| 7,049,757 B2 | 5/2006 | Foust et al. | |
| 7,140,752 B2 | 11/2006 | Ashdown | |
| 7,404,652 B2 * | 7/2008 | Ng et al. | 362/231 |
| 7,568,815 B2 * | 8/2009 | Lee et al. | 362/231 |
| 7,703,943 B2 * | 4/2010 | Li et al. | 362/231 |
| 7,852,010 B2 * | 12/2010 | Negley | 315/185 R |
| 2002/0190661 A1 | 12/2002 | Duggal et al. | |
| 2004/0251818 A1 | 12/2004 | Duggal et al. | |
| 2005/0062446 A1 | 3/2005 | Ashdown | |
| 2006/0125410 A1 | 6/2006 | Duggal et al. | |
| 2008/0019147 A1 | 1/2008 | Erchak | |
| 2008/0048573 A1 | 2/2008 | Ferentz et al. | |
| 2008/0124999 A1 | 5/2008 | Setlur et al. | |
| 2008/0135860 A1 | 6/2008 | Setlur et al. | |
| 2008/0136337 A1 | 6/2008 | Rogojevic et al. | |
| 2008/0137008 A1 | 6/2008 | Rogojevic et al. | |

FOREIGN PATENT DOCUMENTS

| | | | |
|---|---|---|---|
| JP | 2002324685 | * | 8/2002 |
| WO | WO 2005/008196 | | 1/2005 |
| WO | 2008056321 A1 | | 5/2008 |
| WO | 2008113009 A1 | | 9/2008 |

OTHER PUBLICATIONS

International Search Report issued in connection with corresponding PCT Application No. PCT/US2009/059773 on May 25, 2010.

* cited by examiner

*Primary Examiner* — Douglas W Owens
*Assistant Examiner* — Minh D A
(74) *Attorney, Agent, or Firm* — Fay Sharpe LLP

(57) ABSTRACT

An illuminating device includes a light source including a lighting device, such as a solid state lighting device, which emits light, a phosphor material which converts at least a portion of the light emitted by the lighting device to light of a different wavelength. A controller adjusts a ratio of on time to off time of a current waveform supplied to the lighting device. This enables the color of light emitted by the light source to be controlled.

28 Claims, 4 Drawing Sheets

COLOR CONTROL OF LIGHT SOURCES EMPLOYING PHOSPHORS

BACKGROUND OF THE DISCLOSURE

The exemplary embodiment relates to an illumination apparatus which includes a light source including a solid state light emitting device (SSL) such as an LED, laser diode, or organic light emitting device (OLED). It finds particular application in connection with a modulated current source which reduces the observed variation in color temperature which can occur when the light source includes a phosphor material.

Light emitting diodes ("LEDs") are well-known solid state lighting devices that can generate light having a peak wavelength in a specific region of the light spectrum. LEDs are typically used as illuminators, indicators and displays. LEDs based on a gallium nitride (GaN) die have been developed that can efficiently emit light having a peak wavelength in the blue and/or UV region of the spectrum. To produce white light (light with a relatively uniform intensity across the visible range) or other selected light color, the LED is often combined with a phosphor material which includes a phosphor or group of phosphors. Each of the phosphors converts some of the light emitted by the LED to light of a different, generally longer, wavelength using a process known as phosphorescence.

Numerous phosphors and phosphor combinations have been developed for this purpose, as disclosed, for example, in U.S. Pat. Nos. 5,998,925; 6,522,065; and 6,538,371; and U.S. Pub. Nos. 2008/0135860 and 2008/0124999. For example, a phosphor comprising $(Y_{0.4}Gd_{0.6})_3Al_5O_{12}$:Ce is used to convert a portion of a blue emitted light from a GaN die to yellow light. The total emission of the LED device, consisting of the blue GaN device generated light and yellow phosphor emitted light is a generally white light.

An LED has a relatively fast response to the input current, turning on quickly when the current is applied and turning off quickly when the current is switched off. However, the phosphor exhibits a different response. While the phosphor turns on (starts phosphorescing) relatively rapidly in response to the emitted LED light, it has a relatively long decay time. Moreover, the color of LED devices tends to shift over the design lifetime. This means that the color emitted by the illumination apparatus is not consistent over time.

Various attempts have been made to provide consistent color in LED devices. In one approach, multiple phosphors have been used, having different decay times. This requires careful control of the phosphor proportions. In other approaches, multiple LEDs with different emissions have been used, which together generate a desired color, without the need for phosphors. However, the control circuitry for such an arrangement tends to be complex.

Thus, a need exists for a method for achieving a selected color from a light source, such as one that includes a solid state light emitting device in combination with a phosphor material.

SUMMARY OF THE DISCLOSURE

In one aspect of the disclosure, an illumination apparatus includes a light source including a lighting device which emits light and a phosphor material which converts at least a portion of the light emitted by the lighting device to light of a different wavelength. A controller adjusts a ratio of current on time to current off time of a current waveform supplied to the light source whereby a contribution of light emitted by the phosphor to a color of the light emitted by the light source is modified.

In another aspect of the disclosure, a method of varying a color of light emitted by a light source including a lighting device and a phosphor positioned to convert light emitted by the including a lighting device to light of a different wavelength is provided. The method includes changing a ratio of current on time to current off time of a current waveform supplied to the light source whereby a contribution of light emitted by the phosphor to the color of the light emitted by the light source is modified.

In another aspect of the disclosure, a method of maintaining a consistency of a color of light emitted by a light source including a solid state lighting device and a phosphor positioned to convert light emitted by the lighting device to light of a different wavelength is provided. The method includes changing a ratio of current on time to current off time of a current waveform supplied to the lighting device so that a contribution of light emitted by the phosphor to the color of the light emitted by the light source is modified to reduce a change in color of light emitted by the light source.

DETAILED DESCRIPTION OF THE PREFERRED EMBODIMENTS

Aspects of the exemplary embodiment relate to an illumination apparatus which includes a light source comprising a lighting device and a phosphor and to a method of operating such a light source whereby output color of the illumination apparatus can be adjusted. In various aspects, the method includes changing a ratio of current on time to current off time of a current waveform supplied to the lighting device whereby a contribution of light emitted by a phosphor to the color of the light emitted by the light source is modified, thereby adjusting the output color of the light source. The ratio can be adjusted by changing the pulse width in the waveform, while maintaining other parameters of the waveform the same. A variation in a color of light emitted by the light source which would otherwise occur over a lifetime of the light source is thereby reduced.

The exemplary lighting device of the light source is described in terms of a solid state light emitting device (SSL). The SSL can be for example, a light emitting diode (LED), a laser diode an organic light emitting device (OLED) comprising one or more organic layers, or a combination and/or multiple thereof. However, it is to be understood that other lighting devices which emit light when an electric current is applied thereto are also contemplated.

The color of the light output by the light source can be expressed as its correlated color temperature (CCT). The correlated color temperature may be defined as the temperature of a Planckian (black body) radiator in degrees Kelvin (K) whose perceived color most closely resembles the light from the light source.

Briefly, the exemplary illumination apparatus and method take advantage of the fact that phosphors can have relatively long decay times, compared to that of an SSL. By modulating the ratio of the current on time—when both the SSL and the phosphor are emitting, to the off time, when only the phosphor is emitting, the color temperature of the light output by the light source can be controlled and consistency maintained over time. For example, the color temperature of the light source can be consistent to within about ±100K, or within ±50K, of the initial color temperature (e.g., as measured at 100 hrs operation) after an operating period of at least 10,000 hrs.

The color of the light, as used herein, is measured after warm up of the light source, e.g., after it has been operating for at least about one minute, and may be an averaged color temperature, e.g., over an operating period of about 1 hour. The lifetime of the light source over which the variation in color may be reduced can be at least 1000 hours, and may be at least 10,000 hours or at least 50,000 hrs.

Figure 1:
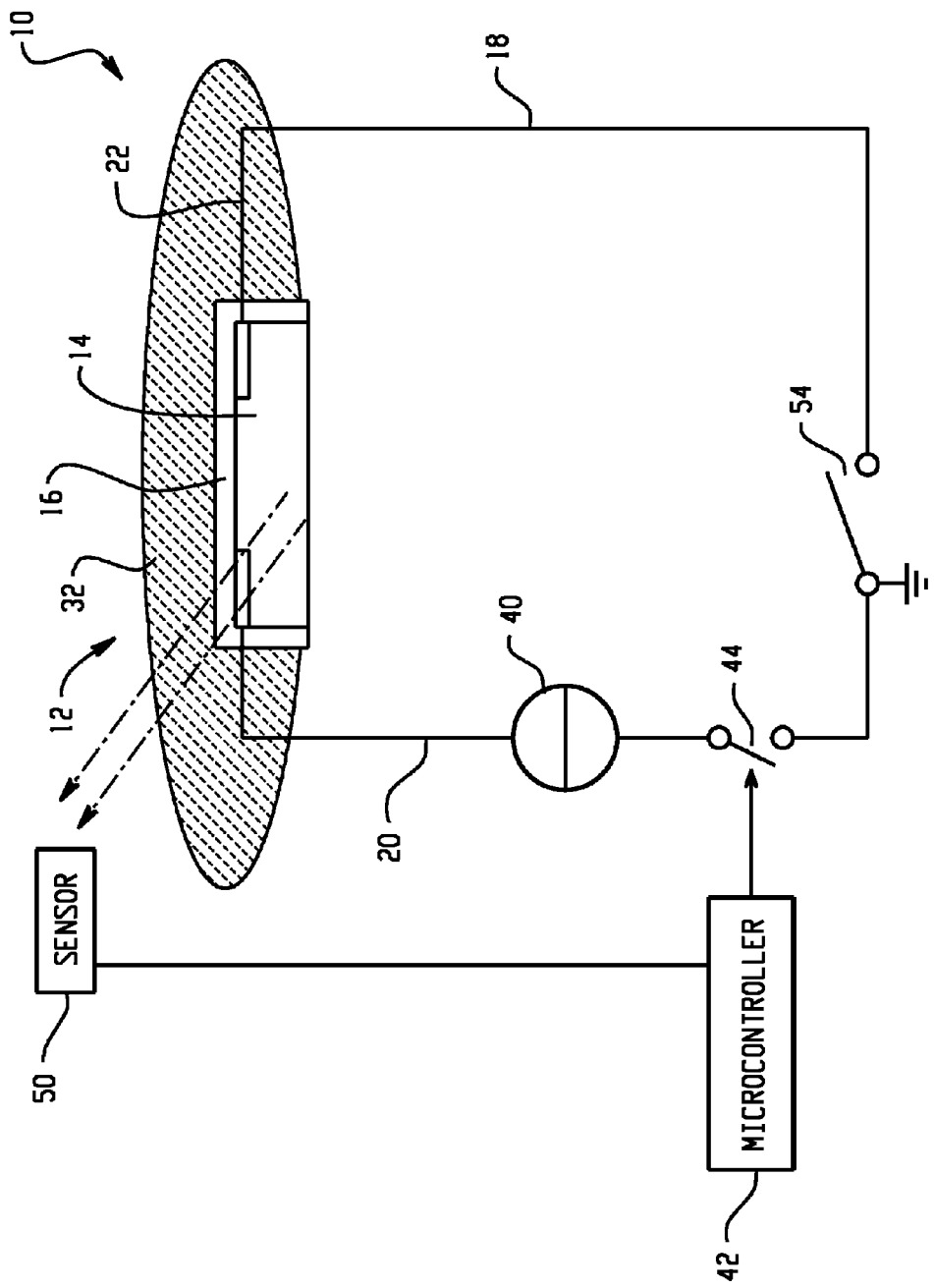
FIG. 1 is a schematic cross-sectional view of an illumination apparatus in accordance with one embodiment of the present disclosure.
Figure 2:
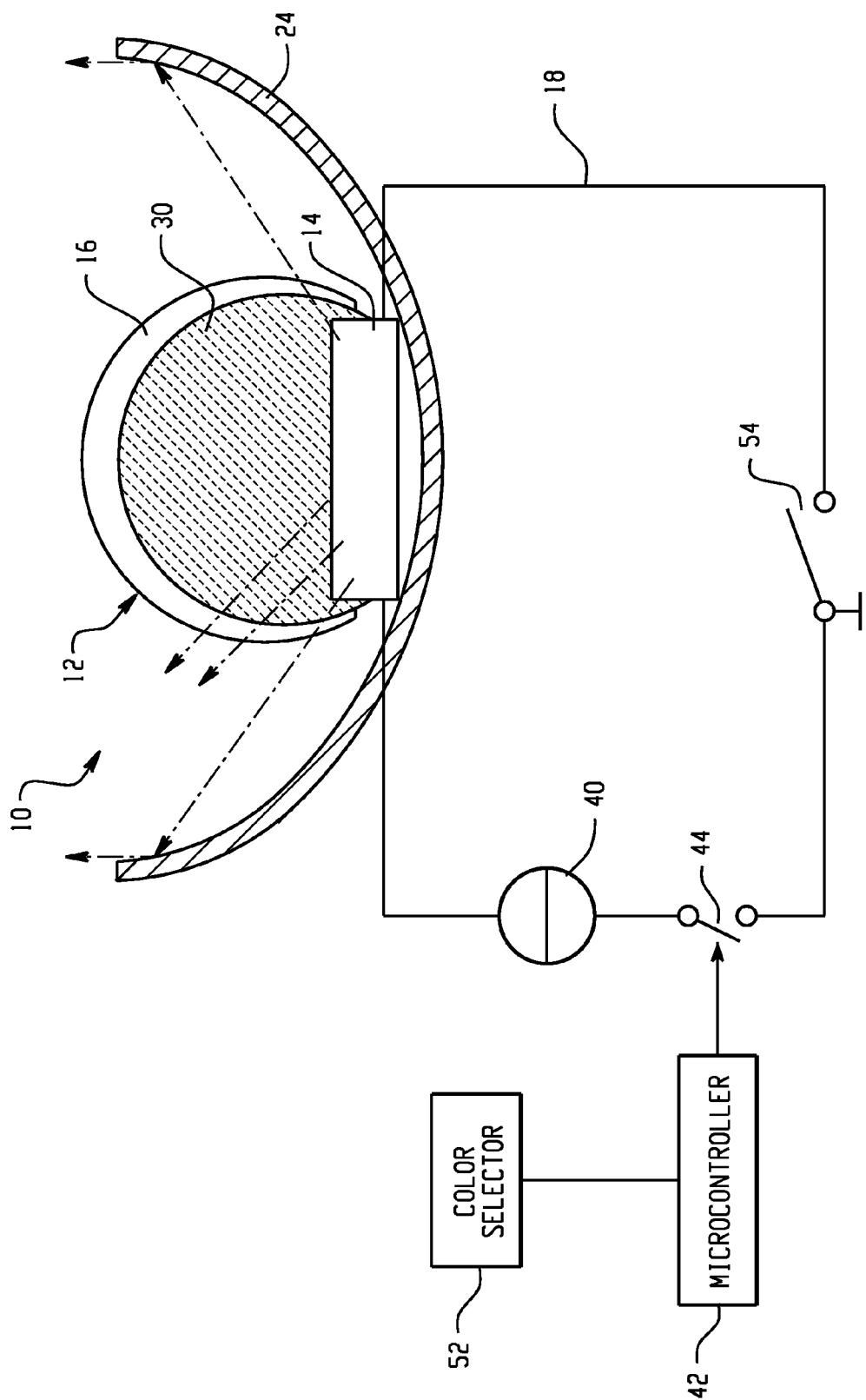
FIG. 2 is a schematic cross-sectional view of an illumination apparatus in accordance with another embodiment of the present disclosure.

With reference to FIGS. 1 and 2, an exemplary illumination apparatus in the form of a lamp 10 is shown. The lamp 10 includes a phosphor-conversion light source 12 which includes a solid state light emitting device (SSL) 14, such as a UV and/or blue LED or OLED, and a phosphor material 16 as a source of converted light. The illumination apparatus includes a drive circuit 18 which powers the SSL. Specifically leads 20, 22, which are electrically attached to the SSL 14, connect the SSL with the drive circuit 18. The leads 20, 22 provide current to the SSL 14 and thus cause the SSL 14 to emit electromagnetic radiation (which for convenience, will be referred to as light), such as UV and or visible light.

The lamp 10 may further include a housing for the light source, such as a reflector housing 24, as illustrated in FIG. 2.

The phosphor material 16 is positioned to receive light emitted by the SSL 14 and convert a portion of the light emitted by the SSL to light of a different (e.g., longer) wavelength. The phosphor material 16 includes one or more phosphors, each with an excitation wavelength matching a part of the SSL emission spectrum and thus capable of converting at least some wavelengths of light emitted by the SSL.

The phosphor material 16 may be in the form of a layer in which a single phosphor or a mixture of phosphors is provided. Or, the phosphor material may be formed of separate layers of different phosphor materials. In either case, the phosphor material may be deposited directly on the SSL 14 or may be spaced therefrom by an intervening layer or layers of light transmissive material. In yet another embodiment, the phosphor material may be dispersed in a light transmissive encapsulant material. By way of example, FIG. 1 shows the phosphor material as a layer directly on the SSL 14, while FIG. 2 shows the phosphor material spaced from the SSL 14 by a layer 30 of encapsulant material. In any of the disclosed embodiments, the lamp 10 provides a light output which is a combination of light emitted by the SSL 14 and converted light emitted by the phosphor 16, which in combination, provide a desired color, e.g., expressed as a correlated color temperature (CCT).

The SSL 14 may be encapsulated within a shell 32 (FIG. 1), which encloses the SSL 14 and phosphor 16. The shell 32 and/or layer 30 may be formed, at least in part, from an encapsulant material, such as glass or plastic, e.g., an epoxy, low temperature glass, polymer, thermoplastic, thermoset material, resin or the like. The shell 32 is typically transparent or substantially optically transmissive with respect to the wavelength of light produced by the SSL 14 and the phosphor containing layer 16 or dispersion.

Various methods for forming the phosphor layer are known. For example, a liquid suspension of the phosphor material, e.g. in a light or thermally curable silicone can be deposited on the SSL 14 and cured, e.g., by light from an external light source or light from the SSL.

The SSL 14 can be any semiconductor blue and/or UV light source that is capable of producing white light of a selected color temperature when its emitted radiation is directed onto the phosphor. Exemplary UV/blue LEDs have an emission wavelength of about 250 nm to 500 nm. Such LEDs may be formed from a plurality of semiconductor layers, one of which is typically GaN or a mixed nitride such as an InGaAlN, wherein the proportions of In, Ga, and Al can be selected to achieve a desired emission spectrum. Such LEDs are well known and are described, for example, in U.S. Pat. Nos. 5,998,925; 6,522,065; and 6,538,371; and U.S. Pub. Nos. 2008/0135860 and 2008/0124999. An OLED includes one or more light emitting layers disposed between two electrodes, e.g., a cathode and a light transmissive anode, formed on a light transmissive substrate. The light emitting layer emits light upon application of a voltage across the anode and cathode. Upon the application of a voltage from a voltage source, electrons are directly injected into the organic layer from the cathode, and holes are directly injected into the organic layer from the anode. The electrons and the holes travel through the organic layer until they recombine at a luminescent center. This recombination process results in the emission of a photon, i.e., light. Methods for forming laser diodes and OLEDs are also well known, as described, for example, in U.S. Pub. Nos. 2002/0190661; 2004/0251818; 2006/0125410; 2008/0136337; 2008/0137008; and U.S. Pat. Nos. 7,049,757; 6,566,808; and 6,800,999.

In operation, electrical power is supplied to the SSL 14 to activate it. When activated, the SSL 14 emits primary light, generally in a direction away from its top surface. At least some of the emitted primary light is absorbed by the phosphor containing layer 16. The phosphor layer 16 then emits a secondary light, i.e., converted light having a longer peak wavelength, in response to absorption of the primary light. For example, the LED has a peak emission at 500 nm or less and the phosphor has a peak emission at above 500 nm. The secondary light is emitted randomly in various directions by the phosphor in the layer 16. At least a portion of the primary and secondary light passes through the shell 32, where present (which may act as a lens), and exits the illumination apparatus 10 as output light. In the FIG. 2 embodiment, light may be reflected from the housing 24 before exiting the lamp.

While in the exemplary embodiment, the lamp includes a single SSL, in other embodiments, the lamp may include a plurality of SSLs, which may all be driven by the same drive circuit or by separate drive circuits.

The drive circuit 18 provides a switched direct current. The exemplary drive circuit includes a power source 40, which in the exemplary embodiment is a DC source, and a controller 42 which controls the switching of the current on and off.

Figure 3:
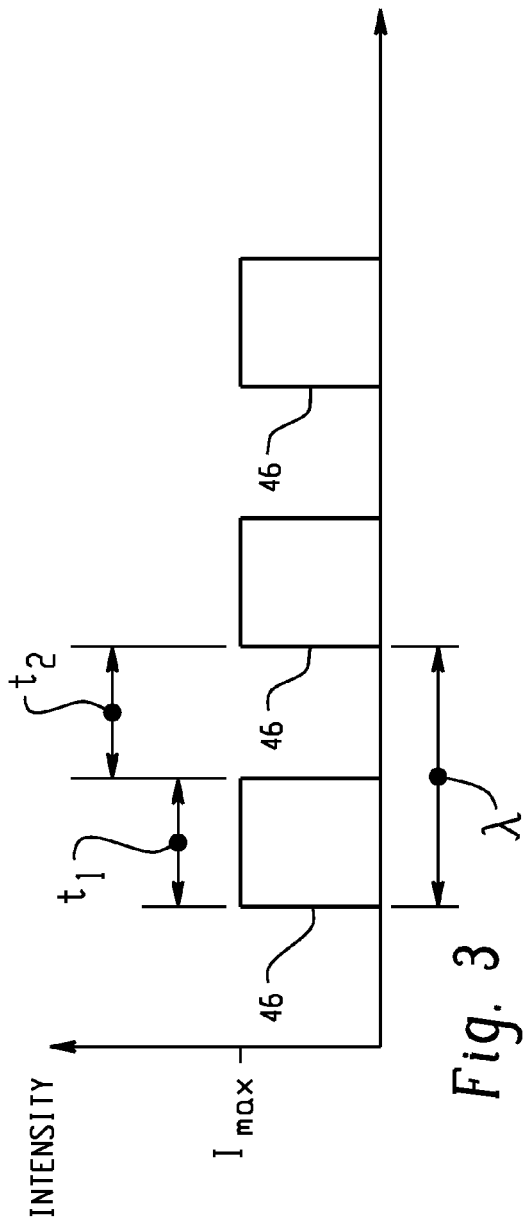
FIG. 3 illustrates a first current waveform applied to the exemplary light source at a first time.

In the exemplary embodiment, the controller 42 is a microcontroller which actuates a switch 44, e.g., a transistor, for repeatedly switching the current on and off. This produces an on pulse 46 in the circuit, e.g., in the form of a square wave, every cycle, each cycle having a wavelength $\lambda$, as illustrated in FIG. 3, which actuates the SSL. The cycle frequency $f(f=1/\lambda)$ may be, for example, at least about 30 Hz, which is fast enough to avoid any apparent flicker of the lamp to the naked eye so that the perceived lamp color is constant. In one embodiment, the frequency f is at least about 50 Hz and in another embodiment, is up to about 150 Hz, or higher. If the frequency is too high, switching losses may become appreciable. Accordingly, in one embodiment, the frequency is less than 110 KHz or less than 1 KHz.

The microcontroller 42 can be a microprocessor and include a CPU, memory for storing software instructions for operating the switch and for modifying the pulse width, such as read only memory (ROM, EPROM, EEPROM), memory for receiving data which is used for determining a modification to the pulse width, such as random access memory (RAM), a clock generator for timing the pulse, and one or more input output (I/O) devices for communication with the switch and other components of the illumination apparatus, all of which may be supported on a single microchip or several chips.

The microcontroller 42 controls a ratio of current on time to current off time $t_1/t_2$ in a waveform supplied to the SSL. In one embodiment, the microcontroller 42 is configured for adjustably controlling the on time (pulse width) $t_1$ of the current pulse (by controlling how long the switch 44 remains open closed in each cycle) and thus serves as a pulse width modulator. In other embodiments, the ratio $t_1/t_2$ may be adjusted by modifying the cycle wavelength λ, in which case, the pulse width may remain the same/

In the exemplary square wave pulse, the current changes substantially instantaneously (e.g., in a few nanoseconds) between 0 and $I_{max}$, is maintained at $I_{max}$ for the on time $t_1$ (pulse width) then changes substantially instantaneously between $I_{max}$ and 0 at the end of the pulse, without dropping below zero (no negative pulses). While a square wave is shown in the exemplary embodiment, other shapes of current pulse are also contemplated such as a trapezoid or saw tooth. In a trapezoid pulse, the current gradually increases to $I_{max}$, e.g., over a few microseconds, and after a set time, gradually decreases from the maximum. In a saw tooth pulse, the current begins to drop once $I_{max}$ is achieved.

As noted above, the ratio of on time to off time $t_1/t_2$ is adjustable by means of the microcontroller 42. This may be achieved through pulse width modulation (PWM), i.e., by adjusting $t_1$. The relationship between $t_1$ and $t_2$ may also be expressed as the duty cycle, which is the percentage of the cycle that the current is on, i.e., the duty cycle $$d = \frac{t_1}{(t_1 + t_2)} \times 100.$$

Figure 4:
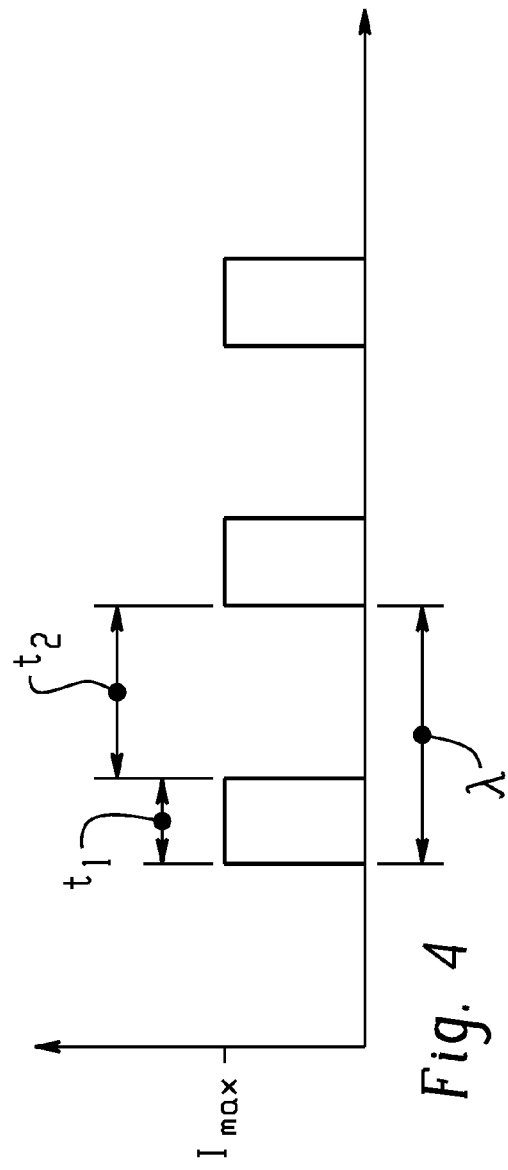
FIG. 4 illustrates a second current waveform applied to the exemplary light source at a second time for maintaining a consistent color.

For example, as shown in FIG. 3, the ratio $t_1/t_2$ is about 1 (a 50% duty cycle), whereas in FIG. 4, it is about 0.5 (a 33% duty cycle). In one embodiment, the ratio $t_1/t_2$ is adjustable by at least a factor of 1.2, e.g., $t_1/t_2$ may vary for example, from about 1.2 to about 1.0, or from 1.0 to about 0.83. In another embodiment, the ratio $t_1/t_2$ is adjustable by a factor of at least at 2, e.g., $t_1/t_2$ can vary from about 1 to about 0.5. In another embodiment, the ratio $t_1/t_2$ is adjustable by a factor of at least 3, e.g., the ratio $t_1/t_2$ may range from 1.5 to 0.5. In other embodiments, the ratio $t_1/t_2$ is adjustable by a factor of at least 4 or at least 10. The ratio $t_1/t_2$ may be adjusted by such a factor in a single step or in several increments, e.g., over the lifetime of the lamp.

In general the pulses are of the same height $I_{max}$ before and after pulse width modulation. However, $I_{max}$ can be adjusted, e.g., to change brightness of the light source.

Figure 5:
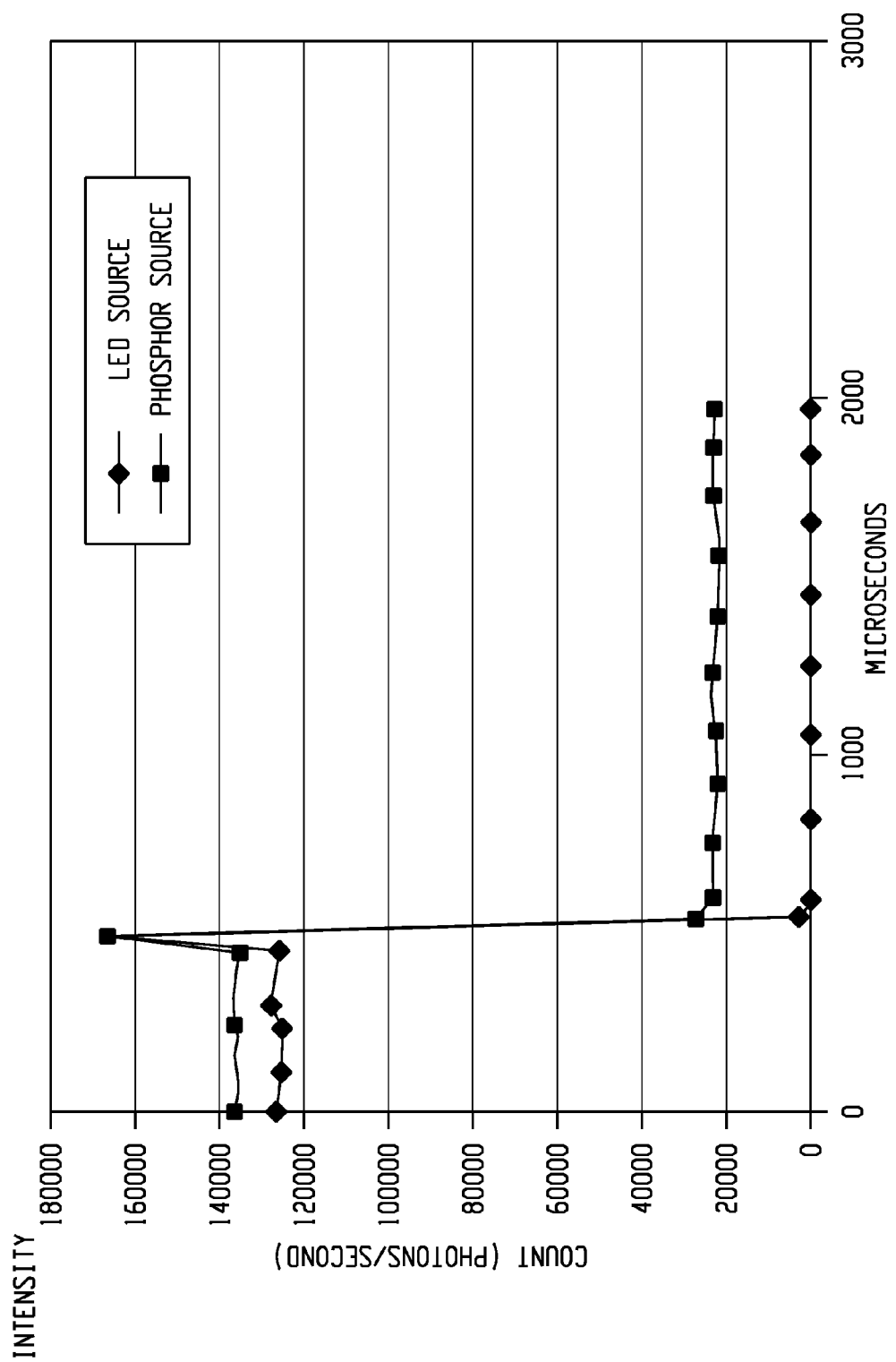
FIG. 5 illustrates the intensity of light emitted by a LED and a phosphor over time.

The ratio of on time to off time $t_1/t_2$ affects the color of the lamp, as will be explained with reference to FIG. 5. This is because the SSL response to the DC pulse differs from that of the phosphor. In particular, as FIG. 5 shows, at a time t=0 (some time after the start of a current pulse) both the SSL 14 and phosphor 16 act as light sources, as exemplified by their respective photon counts. When the current is switched off (at about 500 microseconds in the example shown in FIG. 5) the intensity of the SSL emission drops rapidly to zero, typically within about 10-20 nanoseconds. However, the phosphor 16 continues to emit light at a measurable level, which although lower than that when the current is on, is significant enough to impact the overall color of the light output by the lamp. Although not clearly evident from FIG. 5, the light output of the phosphor eventually decays to 0, but over a longer time period, e.g., over about 10 milliseconds or longer, i.e., at only a small fraction of the rate at which the SSL decays to 0. This difference may be expressed in terms the half life of the decay period (the time taken for the light output by the source to decay to half its maximum value when the current is switched off). The half life of the LED or other SSL may be 10% or less of the half life of the phosphor, and in one embodiment about 1% or less, such as about 0.01% of the half life of the phosphor. In one embodiment, the phosphor has a relatively long decay time (e.g., at least ½ of λ), and may be selected to have a decay time which exceeds the cycle time. For example, if the cycle time λ is about 6.6 ms (150 Hz), the phosphor may be a long decay phosphor having a decay time of at least about 5 ms, such as about 10 ms, while for a cycle time of 50 ms (30 Hz), the phosphor may have a decay time of at least 50 ms.

By choosing a phosphor with a relatively long decay time, the light source can be tuned to produce a different perceived output color (the average color) by varying the $t_1/t_2$ ratio. In general, as the $t_1/t_2$ ratio decreases, the color temperature of the lamp decreases, since the correlated color temperature of the light emitted by the phosphor is lower than the color temperature of the light emitted by the SSL. For example, by changing the $t_1/t_2$ ratio from a first ratio to a second ratio which is lower (or higher) than the first ratio, a color temperature variation in the light output by the lamp of at least about 100K, e.g., up to about 1000K, or more may be achieved. The color temperature can be selected to change the light output from one color temperature to another. Or the ratio can be changed over time to maintain the consistency of the lamp by reducing or substantially eliminating the changes in color temperature which would normally occur over the lifetime of the lamp absent any change to the ratio.

The selected ratio of on time to off time $t_1/t_2$ may depend on the selection of SSL and phosphor. For example, if the SSL is a blue OLED having a correlated color temperature (CCT) of 30,000K and the phosphor has a CCT of 2500K, the CCT can be variably adjusted from 6000K to about 2700K by varying the ratio of on time to off time $t_1/t_2$. In the case of a blue LED rather than an OLED, the color temperature (CCT) may be about 3000-5000K.

While in the exemplary embodiment, the cycle time is maintained at a constant wavelength λ, it is also contemplated that the wavelength may vary during operation of the lamp. Accordingly, the ratio of $t_1/t_2$ can be considered to be the ratio of average on time to average off time (e.g., over a time period of about 10-100 cycles).

In one embodiment, the ability to adjust the color temperature of the lamp by varying the $t_1/t_2$ ratio is used to offset the natural color temperature change which occurs over the lifetime of the lamp. In one embodiment, the microcontroller 42 automatically adjusts the $t_1/t_2$ ratio as the lamp is operated. For example, the $t_1/t_2$ ratio may be decreased in small increments every 100 hours (or other selected period) of lamp operation. The amount to vary the $t_1/t_2$ ratio (or rate of variation) may be determined experimentally, e.g., by running lamps under typical lamp operating conditions and adjusting the $t_1/t_2$ ratio incrementally in order to maintain a consistent color temperature.

In another embodiment, illustrated in FIG. 1, a feedback loop is used to control the microcontroller 42. For example, the microcontroller 42 responds to sensed measurements from a sensor 50, which is positioned to sense the color of the light output by the lamp and to communicate signals representative of the sensed colors to the microcontroller 42. When the measurements indicate a change in the color temperature which exceeds a threshold change, the microcontroller changes the $t_1/t_2$ ratio appropriately. The sensor may be programmed to measure the color of the light only after the lamp has warmed up. A suitable sensor 50 may be a spectrophotometer which measures light intensity at a plurality of different wavelengths.

In another embodiment, the color temperature is selectively adjustable by a user. For example, as shown in FIG. 2, a color selector 52, in communication with the microcontroller 42, is provided. By manipulating the color selector 52 (e.g., by pressing a button, rotating a knob, or the like), the user can select, for example, a variable color temperature between a warm white (about 3000K) and cool white (about 4000K), e.g. in increments of a few hundred Kelvin.

As will be appreciated, in addition to the switch 44, the drive circuit may include a main switch 54, which allows a user to switch the lamp on or off. Additionally, while the circuit is shown as including a single SSL, plural or multiple SSLs may be included in the drive circuit and controlled by a single controller 42.

Phosphors that may suitably be used in the present lamp 10 include, but are not limited to the following general persistent phosphors:

$(Ca,Sr,Ba)Al_2O_4$:Eu,Dy
$SrAl_2O_7$:Eu,Dy
$Sr_4Al_{14}O_{25}$:Eu,Dy
$Sr_2MgSi_2O_7$:Eu,Dy
$(Sr,Ca)MgSi_2O_7$:Eu,Dy
$(Sr,Ca,Ba)Al_2O_4$:Ce
$Zn_{11}Si_4B_{10}O_{34}$:Mn, In
$Ca_2Al_2SiO_7$:Ce, Mn
$CaAl_2O_4$:Ce,Mn
$MgAl_2O_4$:Ce, V

The above phosphors all have long decay times which are suited to a variety of cycle times. Other phosphors with relatively long decay times may be used. (See *Phosphor Handbook 2nd Edition*, Editors Shionoya and Yen).

Without intending to limit the scope of the exemplary embodiment, the following Example demonstrates an application of the exemplary system and method.

EXAMPLES

A long decay blue-green phosphor $Ca_2MgSi_2O_7$:Eu,Dy was driven by an ultraviolet/violet LED source obtained from Nichia. The LED was run at a 50% duty cycle with a frequency of 50 Hz. The LED was driven by a constant current source power supply that was switched on and off by an external metal-oxide-semiconductor field-effect transistor (MOSFET). The MOSFET switch was driven by a PIC16F690 microcontroller. A spectral scan was taken once every 50 microseconds starting at 9.5 milliseconds into the cycle. This captured the change from full on to full off of the LED source that occurs at 10 milliseconds. FIG. 5 shows a plot of the LED source and the phosphor source obtained, which clearly show that the long decay phosphor is emitting energy long after the Led has stopped exciting it. Since the LED and the phosphor emit at very different wavelengths, the ratio of on time to off time and the intensity of the pulse in the on time ($I_{max}$) can be expected to shift the overall average perceived frequency. The combination of the two sources will be integrated and perceived as a constant white light of a particular color temperature.

The invention has been described with reference to the preferred embodiments. Obviously, modifications and alterations will occur to others upon reading and understanding the preceding detailed description. It is intended that the invention be construed as including all such modifications and alterations.

What is claimed is:

1. An illumination apparatus comprising:
a light source comprising a lighting device which emits light and a phosphor material which converts at least a portion of the light emitted by the lighting device to light of a different wavelength; and
a controller which adjusts a ratio of current on time to current off time of a current waveform supplied to the lighting device whereby a contribution of light emitted by the phosphor to a color of the light emitted by the light source is modified, the controller comprising: memory storing software instructions for modifying a pulse width in the waveform, memory for receiving data which is used for determining a modification to the pulse width, and a clock generator for timing the pulse; the controller having a first mode in which pulses having a first width and a first frequency are generated and a second mode in which pulses having a second width are generated, the second width being shorter than the first width, the pulses in the second mode having a frequency which is the same as the first frequency.

2. The illumination apparatus of claim 1, wherein the lighting device comprises a solid state lighting device.

3. The illumination apparatus of claim 2, wherein the solid state lighting device is selected from the group consisting of light emitting diodes, laser diodes, organic light emitting devices, and combinations and multiples thereof.

4. The illumination apparatus of claim 1, wherein the controller adjusts the ratio to reduce a variation in a color of light emitted by the light source over time.

5. The illumination apparatus of claim 1, wherein the controller adjusts the ratio by actuation of a switch.

6. The illumination apparatus of claim 1, wherein the current waveform is a switched DC current.

7. The illumination apparatus of claim 1, wherein the controller is configured for varying a ratio of on time to off time of the current by a factor of at least 1.2.

8. The illumination apparatus of claim 1, wherein the controller generates pulses at a frequency of at least 30 Hz.

9. The illumination apparatus of claim 1, wherein the controller comprises a pulse width modulator.

10. The illumination apparatus of claim 1, wherein the phosphor material has a decay time which is at least half the time of a cycle of the waveform, each cycle comprising a single pulse.

11. The illumination apparatus of claim 1, wherein the controller automatically adjusts the pulse width over time to compensate for changes in output color of the light source.

12. The illumination apparatus of claim 1, further comprising a sensor in communication with the controller, the sensor supplying signal to the controller representative of a color or change in color of the light emitted by the light source.

13. The illumination apparatus of claim 1, further comprising a user actuable selector in communication with the controller.

14. The illumination apparatus of claim 1, wherein by adjusting the ratio of current on time to current off time the controller is capable of adjusting a correlated color temperature of the light source by at least 100K.

15. A solid state illumination apparatus comprising: a light source comprising a lighting device which emits light and a phosphor material which converts at least a portion of the light emitted by the lighting device to light of a different wavelength; and a controller which adjusts a ratio of current on time to current off time of a current waveform supplied to the lighting device whereby a contribution of light emitted by the phosphor to a color of the light emitted by the light source is modified, the controller automatically and incrementally decreasing the ratio of current on time to current off time to the solid state light emitting device over time by several small increments, at preselected time periods, while pulses of the waveform remain of the same height ($I_{max}$), so that, after at least 10,000 hours of operation of the illumination apparatus, the correlated color temperature of the light emitted by the light source is within 100K of an initial correlated color temperature of the light emitted by the light source.

16. The illumination apparatus of claim 15, wherein the controller has a first mode in which pulses having a first width and a first frequency are generated and a second mode in which pulses having a second width are generated, the second width being shorter than the first width, the pulses in the second mode having a frequency which is the same as the first frequency.

17. A method of varying a color of light emitted by a light source comprising a solid state lighting device and a phosphor positioned to convert light emitted by the solid state lighting device to light of a different wavelength, the method comprising;
providing a controller, the controller comprising memory storing software instructions for modifying a pulse width, memory for receiving data which is used for determining a modification to the pulse width, and a clock generator for timing the pulse; and
changing a ratio of current on time to current off time of a current waveform supplied to the solid state lighting device whereby a contribution of light emitted by the phosphor to the color of the light emitted by the light source is modified, including, in a first mode, generating pulses having a first width and a first frequency and a second mode, generating pulses having a second width, the second width being shorter than the first width, the pulses in the second mode having a frequency which is the same as the first frequency.

18. The method of claim 17, wherein the ratio of current on time to current off time is changed to maintain a consistency in the color output by the light source over time.

19. The method of claim 17, wherein the current waveform is a switched DC current and the changing of the ratio includes changing a width of current pulses in the waveform.

20. The method of claim 19, wherein the pulses have a frequency of at least 30 Hz.

21. The method of claim 17, wherein the method includes changing a ratio of on time to off time of the current by a factor of at least 1.2.

22. The method of claim 17, when the ratio of current on time to current off time is changed without changing the frequency of the pulses.

23. The method of claim 17, wherein the color of light emitted by the light source is variable by a color temperature of at least 100K by changing the ratio of current on time to current off time of the current waveform supplied to the solid state lighting device.

24. The method of claim 17, wherein the phosphor material has a decay time which is at least half the time of a cycle of the waveform, each cycle comprising a single pulse.

25. The method of claim 17, further comprising, sensing a color of light emitted by the light source and changing the ratio of current on time to current off time to each solid state lighting device of the light source in response to the sensed color.

26. The method of claim 17, further comprising, changing the ratio of current on time to current off time in response to a user selection.

27. The method of claim 17, wherein the changing the ratio of current on time to current off time is performed automatically over the lifetime of the light source to adjust for a change in color of the light emitted by the light source over time.

28. A method of maintaining a consistency of a color of light emitted by a light source comprising a solid state lighting device and a phosphor positioned to convert light emitted by the solid state lighting device to light of a different wavelength, the method comprising:
changing a ratio of current on time to current off time of a current waveform supplied to the solid state lighting device over a lifetime of the light source so that a contribution of light emitted by the phosphor to the color of the light emitted by the light source is modified to reduce a change in color temperature of light emitted by the light source, including decreasing the ratio of current on time to current off time incrementally in several small increments, at preselected time periods, while pulses of the waveform remain of the same height ($I_{max}$), in order to maintain a consistent color temperature over the lifetime of the lamp source.

* * * * *